United States Patent [19]

Schaefer et al.

[11] Patent Number: 5,068,525
[45] Date of Patent: Nov. 26, 1991

[54] APPARATUS FOR MEASURING THE DURATION OF SINGLE OPTICAL RADIATION PULSES

[75] Inventors: Fritz P. Schaefer; Sandor Szatmari; Jaydev Jethwa, all of Goettingen, Fed. Rep. of Germany

[73] Assignee: Max-Planck-Gesellschaft zur Foerderung der Wissenschaften e.V., Fed. Rep. of Germany

[21] Appl. No.: 566,678

[22] Filed: Aug. 13, 1990

[30] Foreign Application Priority Data

Aug. 14, 1989 [DE] Fed. Rep. of Germany ....... 3926945

[51] Int. Cl.$^5$ ............................................. H01J 31/50
[52] U.S. Cl. ............................. 250/213 VT; 324/77 K
[58] Field of Search ............... 250/213 VT; 324/77 K, 324/77 G

[56] References Cited

U.S. PATENT DOCUMENTS 4,480,192 10/1984 Albrecht et al. ................... 327/77 K
4,681,436 7/1987 Ching et al. ......................... 356/222

Primary Examiner—David C. Nelms
Assistant Examiner—T. Davenport
Attorney, Agent, or Firm—Nields & Lemack

[57] ABSTRACT

An apparatus for measuring the duration of single short optical radiation pulses, particularly laser radiation pulses, by means of autocorrelation and two-photon ionization, contains a Mach-Zehnder interferometer (BS1, BS2, M1, M2) as beam splitter means for generating from a single input radiation pulse (10) two coherent component pulses (14, 16) propagating along two component beam paths (18, 20) each of which contains a section (18a, 20a) passing through a meausring zone (22) where they overlap, further a two-photon ionization detector having a measuring zone (22) and collector electrode means (36) and counter-electrode means (38) at which an electric output signal is available depending on the number of charge carriers generated in the measuring zone when the component beam pulses overlap, and a measuring system connected to the electrode means (36, 38). The collector electrode means (36) contains a number of strip-type collector electrodes which are to each other and electrically separated from each other and are located in a plane essentially parallel to the two component beam paths (18a, 20a) in the measuring zone and are oriented in the longitudinal direction essentially in the direction of the component beam path sections (18a, 22a) passing through the measuring zone (22).

15 Claims, 3 Drawing Sheets

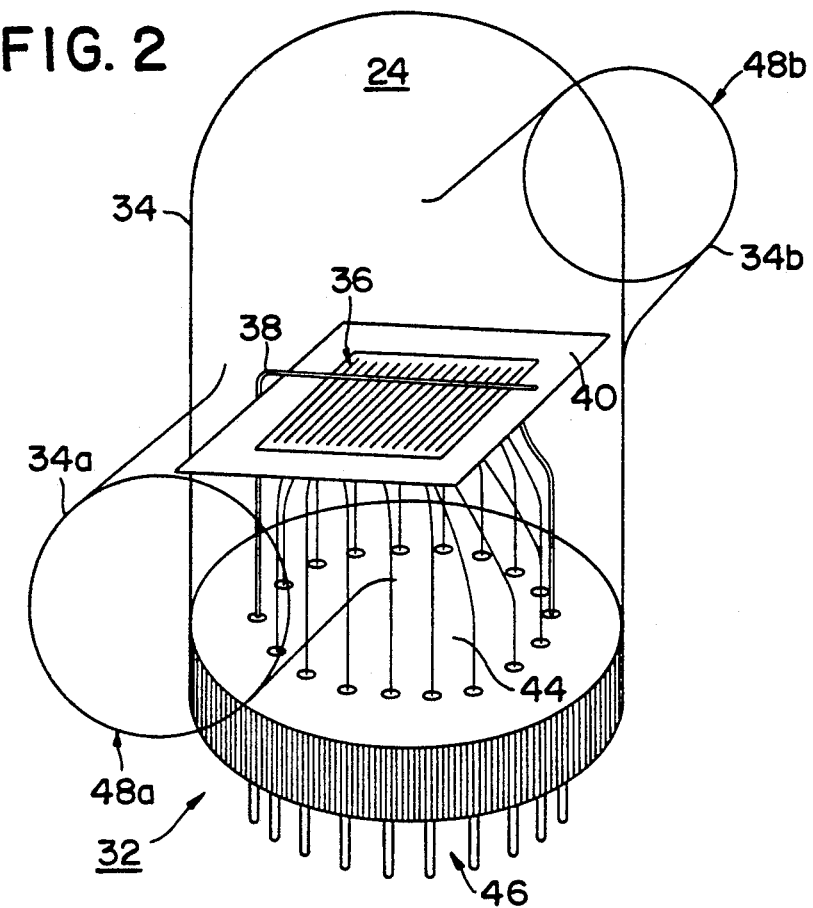
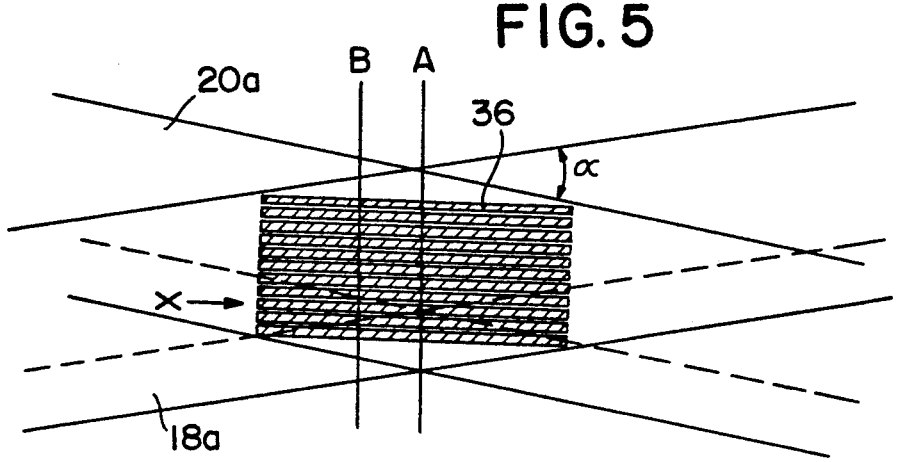

APPARATUS FOR MEASURING THE DURATION OF SINGLE OPTICAL RADIATION PULSES

FIELD OF THE INVENTION

The present invention relates to an apparatus for measuring the duration of single, short radiation pulses, particularly laser radiation pulses by means of an autocorrelator based on multiphoton—particularly on two-photon—ionization comprising beam splitter means for generating from the light beam pulse two coherent component pulses which propogate along two component beam both of which pass through a measuring zone, a photoionization detector located in the measuring electrode means at which an electric output signal is available, depending on the number of charge carriers generated by the radiation in the measuring zone and a measuring system connected to the electrode means.

DESCRIPTION OF THE RELATED ART

An apparatus of this kind is cited by Bourne et al, Rev. Sci. Instrum. 57 (12) December 1986, pages 2979 thru 2982. In the cited apparatus the two component pulses travelling in opposing directions (counter-propagating pulses) are directed colinearly through a two-photon ionization detector in which they generate a distribution of charges permitting good representation of the autocorrelation function of the intensity profile of the two component pulses. The ionization detector has the form of a drift tube along which an electric field is generated for transporting the charge distribution to a collector electrode at which an electric signal accordingly materializes, the time profile of which corresponds to the spatial charge distribution and thus to the autocorrelation function of the intensity profile of the radiation pulse. The upper limit of the measuring range is dictated by the length of the drift tube to approx. 600 ps, its lower limit by the effective response of the measuring system to roughly 25 ps.

As cited by Jansky et al, in Optics Communications, Vol. 23, No. 3 December 1977, pages 293 thru 298 it is known to measure the duration of single ultra-short, i.e. picosecond and subpicosecond light pulses by generating the second harmonic by means of non-collinear intersecting beams in a monoaxial, non-linear quartz crystal. This measuring procedure cannot be used for radiation in the UV region since no suitable non-linear, optical materials are available.

As cited by Szatmári et al, Optics Communications, Vol. 68, No. 3, of Oct. 1, 1988, pages 196 thru 202 it is known to measure the duration of subpicosecond laser radiation pulses by autocorrelation and two-photon ionization of a gas, namely NO. For this purpose a Michelson interferometer is used to generate two versions of the input pulse which are then superimposed in an ionization cell. By shifting one mirror of the interferometer the temporal relationship of the two pulses to each other can be changed, enabling the autocorrelation function to be recorded. By this method there are basically no limits as regards the wavelength and the duration of the pulses, however, this method is not suitable for measuring the duration of single light pulses due to a greater number of such pulses being necessary to obtain the autocorrelation function.

For the photoionization, particularly two-photon ionization (TPI) a variety of measurement gases is available for the various wavelengths involved, such as, for instance, ternary amines, i.e. trimethylamine (Bourne et al., see above) and triethylamine, NO (Szatmári et al., see above), 1,4-diazabicyclo-(2.2.2)octane to name a few.

SUMMARY OF THE INVENTION

An object of the present invention is to provide an apparatus for measuring the duration of single, short radiation pulses which permits to measure the duration and if desired, also the profile of light pulses with fewer restrictions as regards the duration and wavelength than before.

The invention provides an apparatus for measuring the duration of single, short optical radiation pulses by means of an autocorrelator based on multiphoton ionization comprising beam splitter means for generating from a single input light beam pulse two coherent component pulses which propogate along two component beam paths each containing a section passing through a measuring zone.

a photoionization detector containing the measuring zone which in turn contains collector electrode means and counterelectrode means at which an electric output signal is available, depending on the number of charge carriers generated in the measuring zone and a measuring system connected to the electrode means.

According to the invention the collector electrode means contains a number of strip-type collector electrodes in parallel and electrically separated from each other, located in a plane which is essentially parallel to the two component beam path sections in the measuring zone and oriented in the longitudinal direction essentially in the direction of the component beam path sections passing through the measuring zone.

The apparatus according to the invention permits measuring the duration of single optical radiation pulses, particularly laser radiation pulses down to the femtosecond range apparatus is highly sensitive so that only a fraction of the energy of the light pulse need to be tapped for the measurement. By changing the angle between the two component beams the temporal range can be extended at least from aprox. 50 fs to approx. 50 ps. When using suitable measurement gases the apparatus involved is suitable e.g. for wavelengths in the range from approx. 200 nm to 500 nm.

BRIEF DESCRIPTION OF THE DRAWINGS

Embodiments of the present invention will now be explained in more detail in the following with reference to the drawings, in which:

FIG. 2 is a simplified perspective view of a photoionization detector according to the invention;

FIG. 5 is a schematic plan view of a collector electrode means of a photoionization detector according to the invention which can be used in conjunction with the apparatus as shown in FIG. 4.

DESCRIPTION OF THE PREFERRED EMBODIMENTS

An apparatus according to the invention for measuring the duration of single, short radiation pulses by means of an autocorrelator based on multiphoton—particularly two-photon—ionization (TPI) substantially comprises optical means for generating from a single pulse-shaped, i.e. relatively closely limited in the direction of propogation, input light beam two coherent component beams which overlap in a prescribed zone both temporally and spatially and comprising a photoionization detector at the overlapping location.

Figure 1:
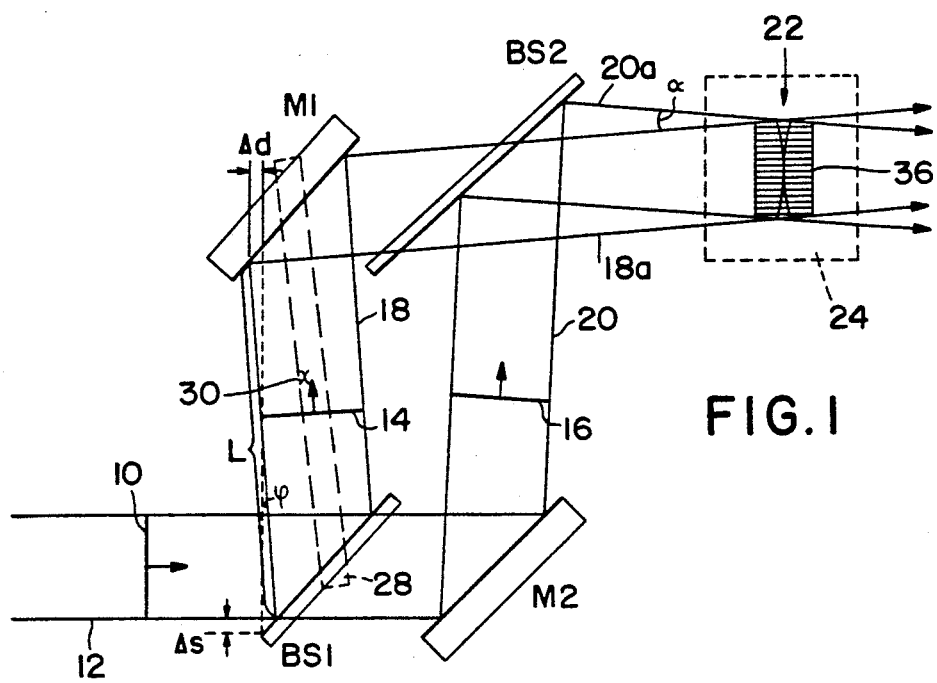
FIG. 1 is a schematic representation of one basic embodiment of the apparatus according to the invention.

In the embodiment as shown in FIG. 1 of the present apparatus the optical means generating the two overlapping component beams is an interferometer, more precisely, a Mach-Zehnder interferometer containing a first semi-transparent mirror acting as a beam splitter BS1, two mirrors M1, M2 permitting total reflection where possible, and a second semi-transparent mirror BS2. The input light beam comprising a short light pulse 10 is incident along an input beam path 12 on the semi-transparent mirror BS1 to produce a first component beam 14 and a second component beam 16 which propogate along the corresponding component beam paths 18 and 20 respectively. The mirrors BS1, M1, M2, BS2 are—as shown in FIG. 1—arranged so that the portion 18a of the component beam path 18 passing through the semi-transparent mirror BS2 intersects portion 20a of the component beam path 20 reflected by the semi-transparent mirror BS2 at a small angle α in a measuring zone 22. Particularly input beam path 12 forms an angle with mirror BS1 which is slightly less than 45 deg. and with mirror M2 an angle which is slightly more than 45 deg. Mirrors BS1 and M1 are arranged in parallel. Mirror BS2 forms together with the incident section of the component beam path 20 an angle which is equal to or slightly less than 45 deg. The measuring zone is located in a chamber 24 of a photoionization detector which is filled with a measurement gas and contains an electrode system having a segmented measuring electrode configuration 26 which with reference to FIG. 2 is explained in more detail.

Using a Mach-Zehnder interferometer as compared to a Michelson interferometer as otherwise used in an apparatus of the kind involved has the advantage that it comprises fewer components and that the conditions (number of reflections, refractions etc.) can be easily made equal for the two component beams. On the other hand, when using a Mach-Zehnder interferometer for autocorrelation measurements it is not so easy as with a Michelson interferometer to change the relative, temporal position of the two component beams which can easily be done using the Michelson interferometer by shifting a mirror in one of the two arms of the interferometer. In the Mach-Zehnder interferometer the relative, temporal position of the two component beams relative to each other can be achieved by moving at least two mirrors in synchronism. This is easiest done by rotating one semi-transparent mirror and one reflecting mirror together in one arm of the interferometer about a prescribed axis without altering the relative position of these two elements with reference to each other, i.e. BS1 and M1, for instance. This can be easily done by mounting BS1 and M1 on a common mounting fixture 28 which is shown merely schematically in FIG. 1 and which is free to turn about an axis 30 located symmetrically in the middle between the mirrored surfaces of BS1 and M1. In this arrangement a small turn of the mounting fixture 28 through an angle $\phi$) will then produce a change in the path length, having the same sign, at both components whilst the direction of the output section 18a of the component beam path 18 remains unchanged and the latter is shifted only slightly by a distance $\Delta$ s. The difference of the path length $$D = \Delta d - \Delta s = L \sin \phi L(1-\cos \phi) \quad (1)$$

where L is the path length between the beam splitter BS1 and the mirror M1. As can be seen from equation (1) The difference in the path length D is a function of the angle $\phi$. For short light pulses, particularly ultrashort laser radiation pulses for which the present apparatus is primarily intended, the necessary change in the path length D is small as compared to L (for example D/L roughly equal to $3 \times 10^{-3}$, the radian value of $\phi$ thus being of the same magnitude). $\Delta$d and $\Delta$s can then be approximated as follows:

$$\Delta d \simeq L\phi \quad (2)$$

$$\Delta s \simeq \frac{L}{2} \phi^2 \quad (3)$$

and thus $$D \simeq \Delta d \quad (4).$$

The practical significance of equation (4) is that the difference in the path length D, i.e. the temporal delay of the two component beams in relation to each other is a linear function of the setting of a suitably positioned micrometer screw (not shown) particularly at a right angle to the longitudinal direction of the mounting fixture 28 for the pair of mirros BS1, M1 through which the latter can be turned.

One preferred embodiment of a photoionization detector 32 sensitive mainly to two-photon ionization is shown in FIG. 2 somewhat simplified. The photoionization detector 32 contains a transparent envelop 34 surrouding the chamber 24 and which is filled with some suitable measurement gas. The nature of the latter depends on the wavelength of the radiation to be measured and any of the known measurement gases can be used at the usual pressures and in the usual concentrations.

The salient part of the photoionization detector 32 is a system of electrodes containing a segmented collector electrode means 36 and a counter-electrode means 38. The former comprises an array of a prescribed number of strip-type collector electrodes—in the present case sixteen—located in a plane parallel to the direction of propogation of the component beams 18a, 20a. These collector electrodes have in the present embodiment a dimension of $20 \times 1$ mm each and are electrically separated from each other by gaps of 0.25 mm. The collector electrode means 36 covers an area of roughly $20 \times 20$ mm$^2$ surrounded by a 7 mm broad, rectangular protecting ring electrode 40 spaced away from the collector electrodes. This has the purpose of producing a well-defined electric field in the measuring zone.

The counter-electrode means 38 according to the embodiment shown in FIG. 2 comprises a single wire-shaped field electrode arranged at a distance away from and parallel to the plane of the collector electrode means 36 and at a right angle to the longitudinal direction of the strip-type collector electrodes. The distance away of the field electrode forming the counter-electrode means 38 from the collector electrode means 36 amounts to 2.5 mm. The collector electrode means and the protective ring electrode are arranged on a ceramic wafer or some other suitable mounting element and electrically connected via through-wires 44 to base pins 46 for connecting the signal processing circuitry as shown in FIG. 2.

The envelop 34 has projections 34a, 34b which are closed off by windows 48a, 48b. The envelop 34 can also be provided with tubing connectors (not shown) or an exhaust tubulation for evacuating and charging with the detector or measuring gas.

As shown schematically in FIG. 2 each strip-type collector electrode of the collector electrode means 36 has its own load resistor 42 which can have a-resistance of 44 megohms and a preamplifier 50 serving as an impedance transformer. The field electrode 38 is maintained at a DC voltage of $-250$ volts during operation. The longitudinal direction of the strip-type collector electrodes of the collector electrode means 36 is oriented parallel to the plane which halves the angle between the two component beams 18a, 20a. The wire-type field electrode is located in the middle of the collector electrode means 36 and parallel to the latter, but at a right angle to the longitudinal direction of the strip-type collector electrodes. Using a wire-type field electrode has the advantage that, in this case, the field strength is a maximum precisely in the middle of the collector electrode means, thus resulting in the electrons collected being mainly those which are produced in the middle of the collector electrode means when viewed in the longitudinal direction, i.e. in the measuring zone 22, which reduces the sensitivity of the adjustment of the direction of the collector electrodes as regards the radiation beams. When alternatively a plate-type field electrode is used, adjusting the detector is more critical, on the other hand its sensitivity to spatial inhomogenities of the radiation is less. This problem is discussed in more detail below on.

The number of collector electrodes in the collector electrode means 36 is dictated by the channel capacity of a multiplexer 54 contained in the processing circuitry 52 (FIG. 3) and, in this case, equals 16. The problem resulting from limiting the number of measuring points to 16 for the autocorrelation curves can be overcome by adapting the width of the autocorrelation curve to the time window for the measurement accordingly. This time window T is the time span during which the two light pulses of the component beam paths overlap in the measuring zone 22. It can be demonstrated that the measurement time window is given by the following equation:

$$\sin \frac{a}{2} = \frac{cT}{l}, \qquad (5)$$

where c is the speed of light, l the width of the collector zone as measured in the direction of the wire-type counter-electrode 38 and $a$ the angle between the two component beam cavities 18a, 20a. The time window T can thus be continuously altered by changing the angle $a$.

One example for typical operating conditions is shown in FIG. 6. Here, the autocorrelation width $\Delta\tau$ roughly equals ⅓ of the time window, achievable for a given light pulse duration by selecting the time window T accordingly. For the optimum ratio $T \approx 3\Delta\tau$ and a pulse characterized by an optimum autocorrelation width $\Delta\tau$ the optimum value of $a$ is:

$$a \approx 2\arcsin \frac{3c\,\Delta\tau}{l} \qquad (6)$$

Figure 3:
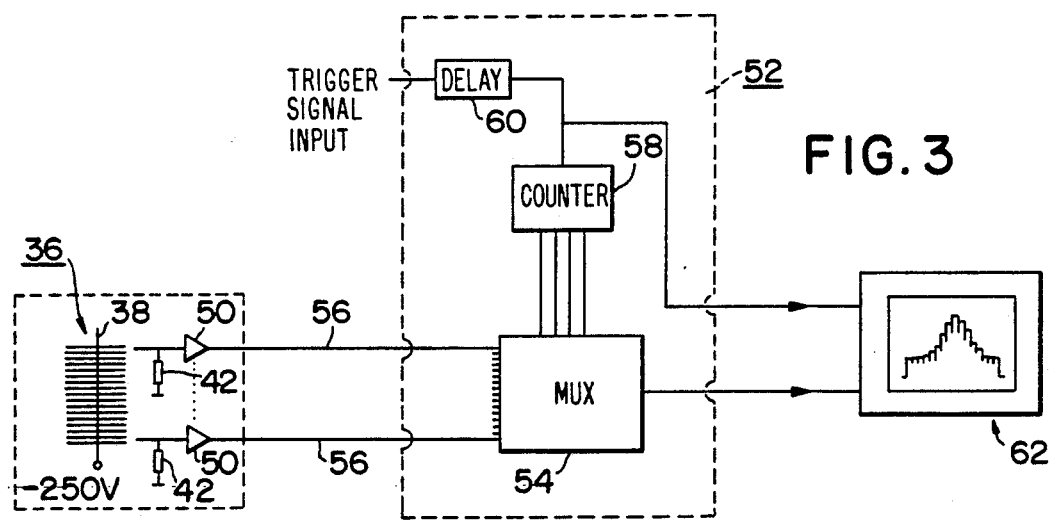
FIG. 3 is a block circuit diagram of an electronic circuit for processing the output signals of the detector shown in FIG. 2.

The electronic circuit for processing the signals output by the collector electrode means 36 is shown in FIG. 3. As already mentioned, each of the sixteen collector electrodes of the collector electrode means 36 is connected to a load resistor 42 and the input of a preamplifier 50. These preamplifiers are operational amplifiers having a JFET input, operating as non-inverting impedance converters with the gain factor 1. The preamplifiers in this case comprise four integrated circuits of the type TL084, each containing four amplifiers and arranged as close as possible to the collector electrode means 36 (i.e. on the underside of the substrate of the collector electrode means 36, in the present example), to maintain the coupling capacities and the sensitivity to electromagnetic noise small. The outputs of the amplifiers are connected by an approx. 2 m long cable, which also incorporates the power supply lines, to the processing circuit 42. The photoionization detector means can thus be moved independently of the processing circuitry whilst ensuring a very low noise level. The outputs of the amplifiers 50 are connected via the cable 56 to the inputs of the 16-channel multiplexer MUX 54 (CMOS analog multiplexer ADG 506 AKN). The four binary address inputs of the multiplexer are coupled to a binary counter 58. This binary counter 58 is started by a trigger pulse which it receives via a delay line 60 from the light pulse source which in this case was a KrF excimer laser. The delayed trigger pulse and the time-multiplexed output signal from the multiplexer 54 are applied to a display device in the form of a storage oscilloscope 62.

Prior to commencing the autocorrelation measurements the apparatus is adjusted so that the two component beams completely overlap in time in the measuring zone. This is tested by a diaphragm having a hole of 0.8 mm diameter and located in the middle of the input beam directly in the input to the interferometer.

More precise investigations show that the spatial resolution of the photoionization detector the field electrode 18 of which being usual spaced from the collector electrode means 36 at d=2.5 mm is not substantially changed when a somewhat lower field electrode voltage of U=250 volts is used. The resolution depends somewhat more on the distance of the input beams from the field electrode 38 as limited by the diaphragm. The resolution is reduced when the input beam is brought nearer to the field electrode, this being particularly obvious at greater distances away of the field electrode from the collector electrode means 36. An electrode spacing of d=2.5 mm proved to be as best suitable, since this effect is then at a minimum in this case.

One problem occurring in the simple embodiment as shown in FIG. 1 is the dependency of the shape of the autocorrelation curve on the intensity distribution in the beam. Two measures which contribute towards reducing this dependency are shown in FIG. 4 and FIG. 5.

Figure 4:
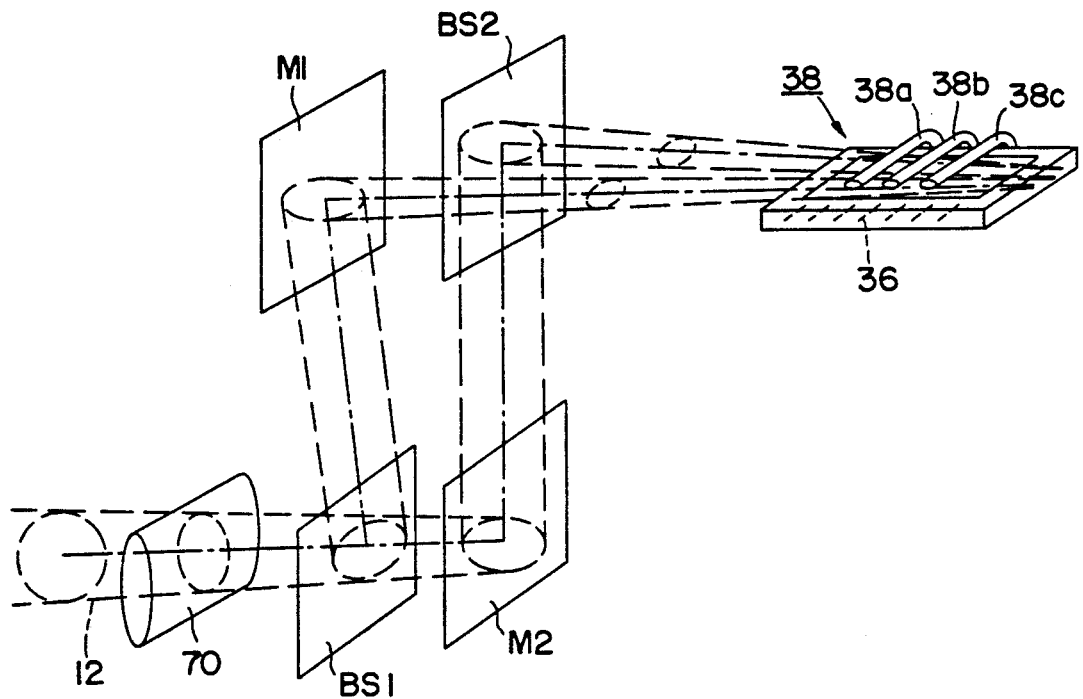
FIG. 4 is a schematic representation of a preferred embodiment of the apparatus according to the invention.

FIG. 4 is a side view of a preferred embodiment of the apparatus according to the invention which basically corresponds to the embodiment shown in FIG. 1 but differing from the latter by two features. Firstly, a cylindrical lens 70 is interposed in the input beam path 12 to focus the beam in the vertical direction, i.e. at right angles to the plane of the collector electrode means 36 so that the radiation is completely passed through the space between the collector electrode means 36 and the counter electrode means 38 spaced above the latter. In this configuration the individual collector electrodes integrate the intensity over the full height of the beam, whilst in the embodiment as shown in FIG. 1 only a region 2.5 mm high of the total beam height of approx. 8 mm is detected. This configuration thus renders irregularities in the beam intensity in the vertical direction more or less irrevelant.

In the horizontal direction the unwanted influence of irregularities in the beam intensity can be substantially reduced by the geometry of the detector arrangement as shown by the modified embodiment shown in FIG. 5. Assuming that the area taken up by the collector electrode means 36 is fully in the overlapping region of the two component beams 18a, 20a and the temporal relationship of the two-light pulses is such that the maximum of the autocorrelation function results in the middle of the collector electrode means, and further assuming that the input light beam has a point of enhanced intensity ("hot spot") as illustrated by the shaded portion in FIG. 5 indicating its location in the two component beams, then a corresponding maximum of the electrical signal will occur at the collector electrode identified X when the electrons collect in a plane A, i.e. where the single wire-type field electrode is positioned.

When the electrons are collected in a plane B, instead, i.e. by providing a wire-type field electrode at this location, the position of the points at which an enhanced electrical signal occurs due to the "hot spots" in the component beams will be changed, whilst the maximum of the autocorrelation function remains unchanged in the middle of the collector electrode means. By providing a plurality of separate field electrodes 38a, 38b, 38c (FIG. 4) which can be activated independently of each other, therefore, the distribution of the intensity can be spatially integrated across the beam without impairing the temporal resolution. When making use of this configuration it must be ensured that the longitudinal direction of the collector electrodes of the collector electrode means 36 is precisely parallel to the line halving the angle between the component beams 18a, 20a. The maximum distance of the additional field electrodes from the plane A is dictated by the limited spatial coherence of the radiation.

In one practical embodiment for measuring the duration of ultrashort laser radiation pulses having a wavelength of 248 nm and a duration of approx. 450 fs the measurement gas used was NO at a pressure of approx. $1.33 \cdot 10^5$ Pa (100 Torrs). The angle $a$ was approx. 5 degrees.

The accuracy of the present apparatus was tested by comparing it with multishot length measurements and the results proved to be satisfactory. Measurements in the wavelength range 200 nm thru 500 nm were implemented with suitable known gases successfully. By changing the angle between the two component beams the duration of the laser radiation pulses was measured in the range 50 fs thru 50 ps.

The resolution can be increased by using more than sixteen collector electrodes and a multiplexer having more than sixteen channels.

What is claimed is:

1. An apparatus for measuring the duration of single, short optical radiation pulses, particularly laser radiation pulses by means of an autocorrelator based on multiphoton ionization comprising beam splitter means (BS1, BS2, M1, M2) for generating from an input light radiation pulse two coherent component pulses (14, 16) which propogate along two component beam paths (18,20) each containing a section (18a, 20a) passing through a measuring zone (22), a photoionization detector (36) containing said measuring zone comprising collector electrode means (36) and counter-electrode means (38) at which an electric output signal is available, depending on the number of charge carriers generated in the measuring zone, and a measuring system (42, 50, 52, 62) connected to said electrode means (36, 38)

characterized in that said collector electrode means (36) contains a number of strip-type collector electrodes in parallel, electrically separated from each other, located in a plane which is essentially parallel to the two component beam path sections (18a,20a) in said measuring zone (22) and oriented in the longitudinal direction essentially in the direction of the component beam cavity sections (18a, 22a) passing through said measuring zone (22).

2. The apparatus according to claim 1 wherein said beam splitter means is arranged so that said component beam path sections (18a, 20a) intersect in said measuring zone (22) at an acute angle and that the longitudinal direction of the collector electrodes is oriented essentially parallel to the line having the angle between the two intersecting sections of the component beam paths.

3. The apparatus according to claim 1 wherein said counter-electrode means (38) contains at least one field electrode located in said measuring zone (22) spaced at a distance away from said collector electrode means (36) and oriented essentially parallel to the latter.

4. The apparatus according to claim 3 wherein said field electrode is of the wire type.

5. The apparatus according to claim 3 wherein said counter electrode means (38) contains at least two wire-type field electrodes (38a, 38b) oriented parallel to each other.

6. The apparatus according to claim 3 wherein said counter-electrode means contains a wire-type field electrode (38b) located in the plane (A, FIG. 5) intersecting the two sections (18a, 20a) of the component beam cavities in the measuring zone.

7. The apparatus according to claim 3 wherein said counter-electrode means contains at least one wire-type field electrode (38a, 38c) located spaced at a distance away from said intersecting plane (A, FIG. 5) of the two component beam sections (18a, 20a) of the component beam paths.

8. The apparatus according to claim 1 further comprising a cylindrical lens (70) for focussing the radiation of the component pulses in the measuring zone (22) in a direction normal to the plane of said collector electrode means (36).

9. The apparatus according to claim 8 wherein said cylindrical lens (70) is located in the beam path (12) before said splitter means.

10. The apparatus according to claim 1 wherein the beam splitter means is a Mach-Zehnder type interferometer having two partially transparent mirrors (BS1, BS2) and two essentially fully reflecting mirrors (M1, M2), the mirrors being arranged to that the emerging sections (18a, 20a) of the component beam paths (18, 20) intersect at an acute angle in said measuring zone (22).

11. The apparatus according to claim 10 wherein one of said partially transparent mirrors and one of said essentially fully reflecting mirrors are mounted on a common mounting fixture (28), said fixture being rotatably mounted.

12. The apparatus according to claim 11 wherein the partially transparent mirror which is mounted on said common mounting fixture (28) is the first partially transparent mirror in the propagating direction of the radiation pulse and the fully reflecting mirror which is mounted on said common mounting fixture is that fully reflecting mirror which is located in the component beam path (18) reflected by said partially transparent mirror mounted on said fixture.

13. The apparatus according to claim 1 wherein said measuring system comprises a multiplexer (54) having a plurality of inputs and an output; the collector electrodes of said collector electrode means (36) being coupled to corresponding inputs of said multiplexer (54) and the output of the multiplexer being coupled to a recording device (62).

14. The apparatus according to claim 13 wherein the collector electrodes are coupled to the inputs of the multiplexer via impedance transforming means (50).

15. The apparatus according to claim 13 wherein the multiplexer is controlled by controller means (58) triggered by a delayed signal from a radiation source furnishing the radiation pulse.

* * * * *